United States Patent
Herold et al.

(10) Patent No.: US 10,651,755 B2
(45) Date of Patent: May 12, 2020

(54) STANDBY AND CHARGING OF MODULAR MULTILEVEL CONVERTERS

(71) Applicant: ABB Schweiz AG, Baden (CH)

(72) Inventors: Simon Herold, Affoltern am Albis (CH); Beat Buchmann, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 215 days.

(21) Appl. No.: 15/617,583

(22) Filed: Jun. 8, 2017

(65) Prior Publication Data

US 2017/0271997 A1 Sep. 21, 2017

Related U.S. Application Data

(63) Continuation of application No. PCT/EP2015/076257, filed on Nov. 10, 2015.

(30) Foreign Application Priority Data

Dec. 12, 2014 (EP) .................................. 14197755

(51) Int. Cl.
*H02M 5/42* (2006.01)
*H02M 7/483* (2007.01)
(Continued)

(52) U.S. Cl.
CPC ................ *H02M 5/42* (2013.01); *B60M 3/00* (2013.01); *H02J 3/1857* (2013.01); *H02J 7/02* (2013.01);
(Continued)

(58) Field of Classification Search
CPC .......... H02M 1/36; H02M 5/42; H02M 7/483; H02M 2001/0032; H02M 2007/4835;
(Continued)

(56) References Cited

U.S. PATENT DOCUMENTS 9,419,539 B2 * 8/2016 Tenca .................... H02M 7/217
2009/0140706 A1 * 6/2009 Taufik ................ H02M 3/1584
323/272
(Continued)

FOREIGN PATENT DOCUMENTS

CN         103337951 A    10/2013
WO      2014023334 A1    2/2014

OTHER PUBLICATIONS

European Patent Office, International Search Report and Written Opinion issued in corresponding Application No. PCT/EP2015/076257, dated Jan. 27, 2016, 13 pp.
(Continued)

*Primary Examiner* — Alfonso Perez Borroto
*Assistant Examiner* — Esayas G Yeshaw
(74) *Attorney, Agent, or Firm* — Taft Stettinius & Hollister LLP; J. Bruce Schelkopf

(57) ABSTRACT

The present invention proposes a hybrid converter branch operating mode for a Modular Multilevel power Converter MMC with MMC cells in distinct subsets operating according to a "pulse blocked" cell operation mode with DC cell voltage increase or according to a "bypass" cell operation mode without DC cell voltage increase. Repeated cell subset assignment and corresponding alternation of cell operating mode allows to reduce or at least manage a mean deviation of the cell capacitor DC voltages of the converter cells. The invention also reduces no-load losses of the MMC in standby mode and a charging voltage in an MMC charging mode.

14 Claims, 4 Drawing Sheets

(51) Int. Cl.
*H02J 3/18* (2006.01)
*B60M 3/00* (2006.01)
*H02J 7/02* (2016.01)
*H02M 1/00* (2006.01)
*H02M 1/36* (2007.01)
*H02J 7/34* (2006.01)

(52) U.S. Cl.
CPC ............. *H02M 7/483* (2013.01); *H02J 7/345* (2013.01); *H02M 1/36* (2013.01); *H02M 2001/0032* (2013.01); *H02M 2007/4835* (2013.01); *Y02B 70/16* (2013.01); *Y02E 40/26* (2013.01)

(58) Field of Classification Search
CPC . H02J 3/1857; H02J 7/345; H02J 7/02; Y02E 40/26; B60M 3/00; Y02B 70/16
See application file for complete search history.

(56) References Cited

U.S. PATENT DOCUMENTS

| | | | |
|---|---|---|---|
| 2014/0002048 A1 | 1/2014 | Pang et al. | |
| 2014/0247629 A1* | 9/2014 | Crane | H02J 3/36 363/35 |
| 2015/0078053 A1* | 3/2015 | Harrison | H02M 5/297 363/132 |
| 2016/0036314 A1* | 2/2016 | Koyanagi | H02M 1/32 363/65 |
| 2016/0056710 A1* | 2/2016 | Hafner | H02M 1/32 363/53 |
| 2017/0126127 A1* | 5/2017 | Koyanagi | H02M 1/32 |

OTHER PUBLICATIONS

European Patent Office, Extended Search Report issued in corresponding Application No. 14197755.3, dated Jun. 2, 2015, 6 pp.
Fan et al., "An Improved Control System for Modular Multilevel Converters Featuring New Modulation Strategy and Voltage Balancing Control," 2013 IEEE Energy Conversion Congress and Exposition, Sep. 15, 2013, pp. 4000-4007.
Saeedifard et al., "Dynamic Performance of a Modular Multilevel Back-to-Back HVDC System," IEEE Transactions on Power Delivery, vol. 25, No. 4, Oct. 2010, pp. 2903-2912.

* cited by examiner

STANDBY AND CHARGING OF MODULAR MULTILEVEL CONVERTERS

FIELD OF THE INVENTION

The invention relates to the field of Modular Multilevel Converters in electric power systems, specifically to standby and charging modes of such converters prior to operation.

BACKGROUND OF THE INVENTION

A Modular Multilevel power Converter (MMC), also known as Chain-Link Converter (CLC), comprises converter branches each with a plurality of e.g. ten to forty converter cells, or converter sub-modules, connected in series, wherein the converter branches in turn may be arranged in a wye/star, delta, and/or indirect converter topology. A converter cell is either a bipolar cell with a full-bridge circuit or a unipolar cell with a half-bridge circuit, and comprises a capacitor for storing energy and power semiconductor switches such as insulated gate bipolar transistor (IGBT) devices, integrated gate-commutated thyristor (IGCT) devices, gate-turn-off thyristor (GTO) devices, or MOSFETs for connecting the capacitor to the converter branch with one or two polarities. The voltage per converter cell capacitor may be between 1 kV and 6 kV; whereas the voltage of a converter branch may be in a range from 10 kV to several 100 kV. An MMC controller with a processor and corresponding software, and/or with a Field Programmable Gate Array (FPGA), is responsible for controlling the converter cells and operating the power semiconductor switches by means of a dedicated (pulse-width) modulation scheme.

MMCs may be used in electric power transmission systems as ac-only Static VAR Compensators (Statcoms) and/or Flexible AC Transmission Systems (FACTS) devices for static power-factor correction as well as for voltage quality and stability purposes. A Statcom provides reactive power support to an electric power transmission network or grid to which the Statcom is connected, by producing or absorbing reactive power.

An operating MMC requires a certain amount of energy which must be provided to the converter before connecting the converter to an electric grid. To that purpose, charging, or pre-charging, of the converter cell capacitors is performed by way of passive charging or by reverting to external charging control.

Passive charging is executed by connecting the uncharged converter with blocked firing pulses to the main electric grid via charging resistors. The charging resistors limit the inrush current as the main breaker closes and the cell capacitors are charged to about nominal voltage by the grid voltage rectification through the freewheeling diodes of the converter. Passive charging of the capacitors is performed slowly and hence takes between ten seconds to several minutes to complete. No voltage balancing is required since the impedance of the cell DC capacitors is dominant and thus the voltage drift is minor in this time range.

External charging control on the other hand requires additional control hardware and auxiliary power supply. The uncharged converter is connected with blocked firing pulses to the auxiliary power supply to receive a charging voltage comparable to the grid voltage of the main electric grid. External charging preferably involves a low voltage auxiliary power supply connected to a dedicated step-up charging transformer transforming the low voltage of the auxiliary power supply to the charging voltage. Charging resistors are not required in this case since the charging transformers impedance limits the inrush current.

For most converter applications a standby operation or state is defined, in which the main breaker is closed and thus a main AC voltage is applied to the corresponding converter terminals, but the converter is not supposed to feed any current into the grid. The converter system in standby mode is ready to resume operation immediately upon a respective command from the control system.

For classical two and three level Voltage Source Inverters (VSI) the standby mode is implemented by blocking simultaneously all firing pulses, or gate pulses, directed to the semiconductor switches, which results in a stable state of the grid-connected VSI. The voltage of the DC link of a VSI is kept at about nominal by the grid voltage rectification through the freewheeling diodes of the converter, with a possible deviation between the voltages of the upper and lower capacitor of a three level VSI generally being a minor issue.

For MMCs a standby mode may likewise be implemented by blocking the firing pulses. However, for this type of converters such a mode of operation is not stable and may typically be active only for a few minutes before a deviation between, or among, the DC voltages of the cell capacitors reaches unacceptable values. Therefore the standby mode for MMC converters is conventionally implemented with all semiconductor switches actively switching and enabling a current to flow through the branches of the converter. This current allows to balance the individual cell capacitor DC voltages. The currents through the individual branches are selected such that cancelation is obtained at the connection points of different branches and thus no current is fed into the mains. Often the term 'circulating currents' is used to denote such a concept.

The standby mode using circulating currents to balance the individual cell capacitor DC voltages generates losses. These are no-load losses since the converter is not supposed to feed any active nor reactive power into the mains in standby mode. For applications such as Statcoms or rail interties with static frequency conversion for traction supply, which make extensive use of the standby mode, these stand-by losses result in substantial cost for the utilities and/or penalties for the converter supplier.

DESCRIPTION OF THE INVENTION

It is an objective of the invention to reduce a deviation of cell capacitor DC voltages of Modular Multilevel power Converter (MMC) cells operated with blocked firing pulses in standby or charging MMC modes. Specifically, it is an objective to reduce no-load losses of the MMC in standby mode, and to reduce a charging voltage in an MMC charging mode. These objectives are achieved by a method and a controller according to the independent claims. Preferred embodiments are evident from the dependent patent claims.

According to the invention, a method of operating a Modular Multilevel Converter (MMC) having a converter branch with a plurality of converter cells each including a cell capacitor and two power semiconductor switches, being designed for a nominal cell or capacitor voltage, and being controlled by, or operated through, an MMC controller comprises the steps of applying a branch voltage to the converter branch, the branch voltage being inferior to a nominal branch voltage cumulative, or corresponding to a total, of the nominal cell voltages of the cells of the branch;

selecting a first subset of the plurality of converter cells of the branch, and selecting a second subset of the plurality of converter cells of the branch which is distinct from and larger than the first subset;

operating successively the first and second subset in a firing or gate "pulse blocked" cell operation mode with DC cell voltage increase, and operating a respective complementary subset of the plurality of converter cells of the branch in a "bypass", or "zero output voltage" cell operation mode without DC cell voltage increase.

The invention proposes a hybrid MMC converter branch operating mode with MMC cells in distinct subsets operating according to distinct cell operating modes or states, and with a repeatedly renewed assignment of the cells to the distinct subsets. Repeated cell selection, subset assignment, and corresponding alternation of cell operating mode allows to reduce or at least manage a mean deviation, or a variance of a distribution, of the cell capacitor DC voltages of the converter cells. Alternation of cell operating mode takes place at a frequency well below the line frequency of a power grid, and preferably between one and ten times per second.

In detail, cells of a first subset are operated in "pulse block" mode with firing pulses, or gate pulses, from a control unit to the semiconductors being blocked or suppressed, specifically by preventing these pulses or commands from being generated and sent by the control unit. In this first cell operation mode or state the semiconductor switches are open, which enables a re-charging of the cell capacitance and corresponding increase in cell capacitor DC voltage.

Cells of a complementary subset are operated in "bypass" or "zero output voltage" mode. In this second cell operation mode or state the semiconductor switches of a cell are suitably open and close such as to short-circuit the poles of the cell, with a zero modulation vector that does not give rise to inter-cell circulating currents. The cells which are in zero output voltage state are not available for re-charging through the mains and their capacitor DC voltage will gradually decrease due to the auxiliary supply power drawn from the cell capacitor for cell operation, due to a base power consumption of the gate drives, or due to leakage currents. The discharging of the cell capacitor in the bypass mode represents a residual and unavoidable standby loss. On the other hand, dedicated discharge resistors and/or high frequency switching of the semiconductors may be used to force a cell capacitor discharge if needed.

In a preferred embodiment, at subset selection the highest cell voltage of the converter cells of the first and second subset is selected to be below a lowest cell voltage of the converter cells of the respective complementary subset. In other words, a sorting algorithm selects always the cells with the highest cell capacitor DC voltages to be in bypass mode, whereas the cells with the lowest capacitor DC voltages remain in pulse block mode to be charged from the mains through the freewheeling diodes. The sorting algorithm is executed at a rather low rate well below a line frequency, preferably between one to ten times per second. The semiconductor switch operations at transition between pulse block and bypass mode as possibly induced by the latest sorting result also occur at a low rate and hence with further reduced no-load losses.

In an advantageous MMC standby mode the MMC is connected to an electric power grid without nominal power exchange, with branch terminals or branch ends connected to phase conductors of the electric power grid to apply a grid branch voltage to the converter branch. The invention allows to balance the individual cell capacitor DC voltages without the use of circulating currents. Therefor the no-load losses of the converter system are reduced substantially which also implies operation cost savings and noise emission reduction. The invention takes advantage of the fact that in MMC standby mode not all cells of a converter branch are required to block, or withstand, the grid branch voltage applied to the branch terminals, because a voltage margin for overvoltage and/or control is included in the converter design and because the converter may comprise redundant cells. In other words, the grid branch voltage applied is generally below the nominal branch voltage cumulative of the nominal cell voltages. It is estimated that less than twenty percent, and preferably between five to ten percent, of the cells of a branch represent the voltage margin or redundancy level and thus may be chosen at a time for bypass mode.

In an advantageous MMC external charging mode the MMC is connected to auxiliary external charging equipment, with the branch terminals connected to an auxiliary power supply to apply a charging branch voltage to the terminals. The invention allows to reduce the required charging voltage provided by the auxiliary charging equipment to a value well below a nominal converter voltage. A lower charging voltage ultimately reduces the cost of a charging transformer in cases where such step-up charging transformer is employed. In addition, a same charging transformer may be used for a range of nominal converter voltages of a converter family with a configurable number of cells per branch and corresponding nominal voltage. In other words, the invention reduces the total number of required charging transformer types—single size charging equipment with one charging voltage to be applied to distinct subsets of blocked cells being sufficient to successively charge converter cell subsets of any size.

Specifically, in a charging mode, the number of cells which are operated in pulse block state is much smaller than for standby mode, and generally determined by the charging voltage. If the latter is in the range of 25% of the nominal branch voltage, one out of four cells of a branch may be operated in pulse block mode and as such may be charging to full or nominal cell voltage. The complementary subset including the remaining 75% of the branch cells are operated in bypass mode, gradually discharging the cell capacitor until being in turn selected for pulse block mode.

In order to avoid the medium voltage insulation requirements related to external power sourcing of the power semiconductor switches from ground potential, the auxiliary supply power required for operation of a gate drive of a semiconductor switch of an MMC cell may be drawn from the cell capacitor. Accordingly, the above MMC charging mode may be preceded by an initial charging step during which the power semiconductor switches remain open until an initial charging through the free-wheeling diodes of the cell leads to a certain minimum cell capacitor voltage. Once all cells have become active, the MMC may engage the aforementioned charging mode and place a subset of the cells in bypass mode.

The MMC charging mode according to the invention allows to keep the converter in a charged condition at the end of the charging process without any time restrictions and without having to close the main breaker. This provides additional standby options to the operator and offers flexibility during commissioning or troubleshooting. On the other hand, a seamless transition from MMC charging to MMC standby mode with closed main breakers is also possible.

BRIEF DESCRIPTION OF THE DRAWINGS

The subject matter of the invention will be explained in more detail in the following text with reference to preferred exemplary embodiments which are illustrated in the attached drawings, in which identical parts are provided with the same reference symbols in the figures.

DETAILED DESCRIPTION OF PREFERRED EMBODIMENTS

The invention is equally advantageous for all kinds of Modular Multilevel power Converter (MMC) applications. By way of example, the MMC may be used in electric power transmission systems as Static VAR Compensator (Statcom) for static power-factor correction. AC-only Statcoms provide reactive power support to an electric power grid by producing or absorbing reactive power. MMCs may likewise be used for converting and/or inverting AC current into DC current and/or vice versa, for converting a single or multi-phase current into another single or multi-phase current, in particular for converting AC current of a first frequency into AC current of a second frequency, or for connecting a load or power source with a power grid. Nevertheless, the invention is of particular interest to those applications with demanding no-load loss requirements, such as Statcom, rail interties with static frequency conversion for traction supply, and for hydro power applications with conversion of variable frequency current to power grid line frequency current.

Figure 1:
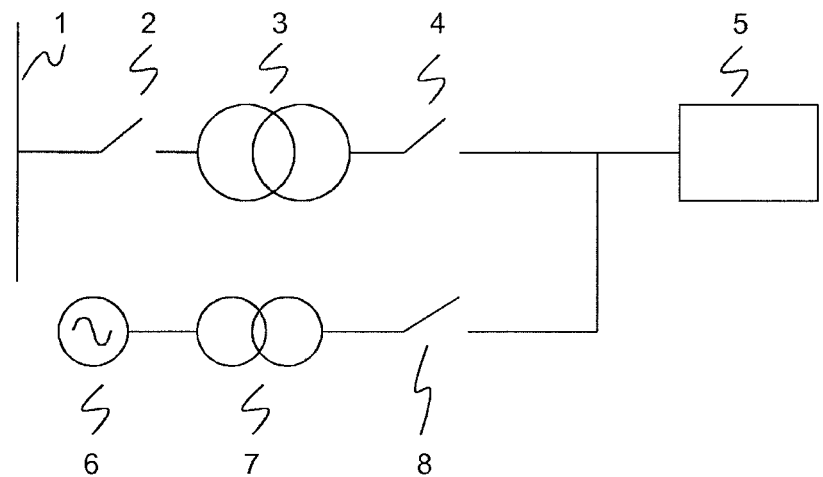
FIG. 1 depicts an exemplary MMC set-up including charging circuit.

FIG. 1 depicts an exemplary MMC set-up. A three phase AC power grid 1 is connectable via a main circuit breaker, or converter feeder breaker, 2 to a primary side of a main, or power, transformer 3. A secondary side of the main transformer is connectable, via converter disconnetor 4, to AC terminals of an MMC 5. A charging unit including an auxiliary power source 6 and a dedicated auxiliary or charging transformer 7 to which the source 6 is connectable, is connectable to the AC terminals of the MMC via a charging switch, or disconnector, 8. Converter disconnector 4 is provided in the supply line between the main transformer 3 and a connection point of the charging unit in order to allow disconnecting the main transformer 3 during charging. The presence of the main transformer and converter disconnector is optional.

Figure 2:
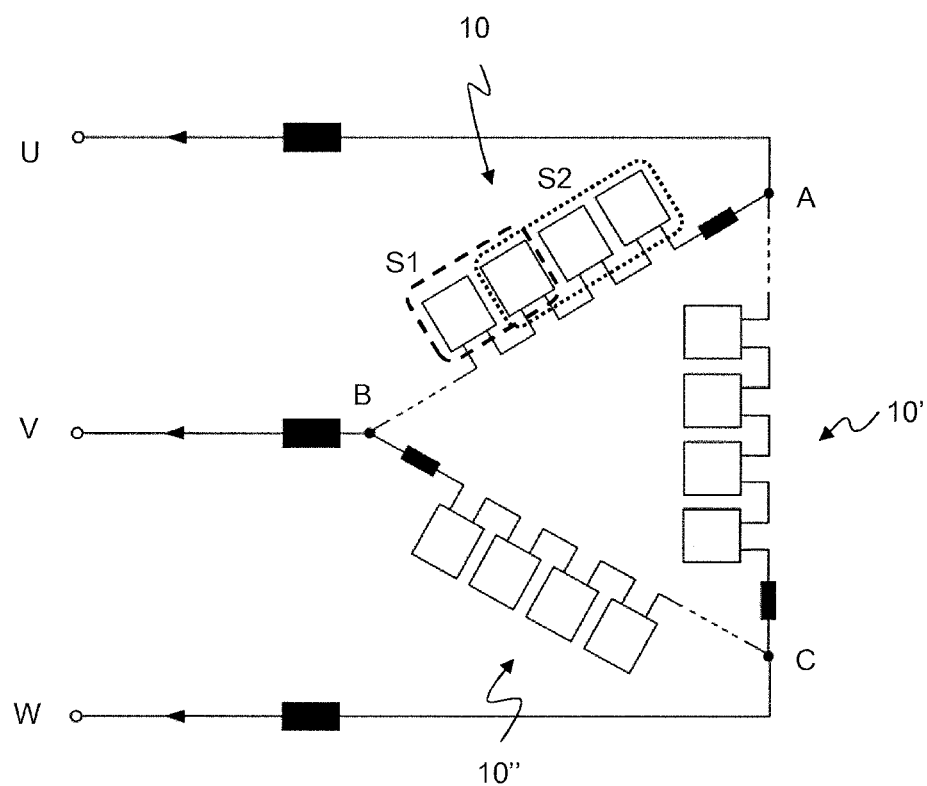
FIG. 2 depicts a delta topology of an exemplary MMC Statcom.

FIG. 2 depicts a delta topology of an exemplary MMC Statcom, with three converter terminals U, V, W. The converter terminals coincide with branch terminals, or branch ends, or branch connection points, A, B, C, of the three delta-connected converter branches 10, 10', 10", such that the voltage applied to a converter branch is equal to a line-to-line, or phase-to-phase AC voltage of the power grid. The branches are shown with four converter cells each, wherein a larger number of forty cells or more per branch is possible. For exemplary branch 10, a first subset S1 comprising two converter cells and a second subset S2 comprising three converter cells are indicated by dotted and broken rectangles. The individual converter cells are of a unipolar or, more preferably, bipolar type as depicted in FIG. 6 below.

Figure 3:
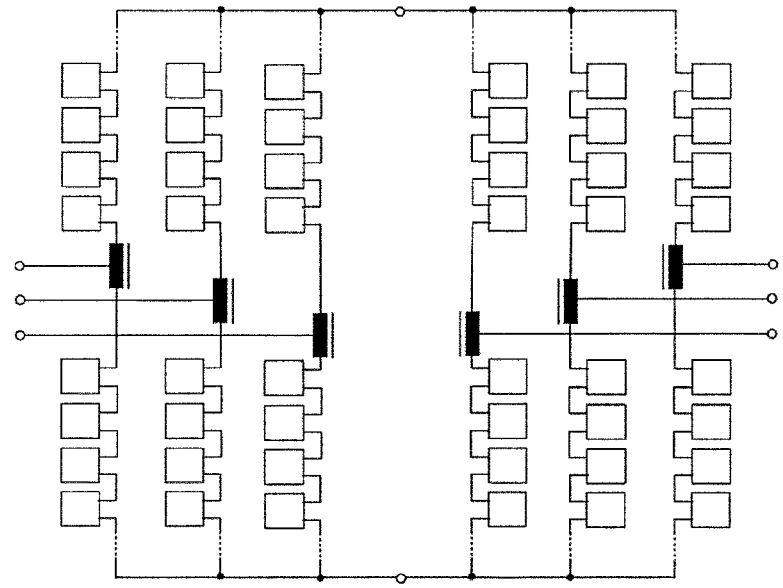
FIG. 3 depicts a direct topology of a static frequency converter for traction supply.
Figure 4:
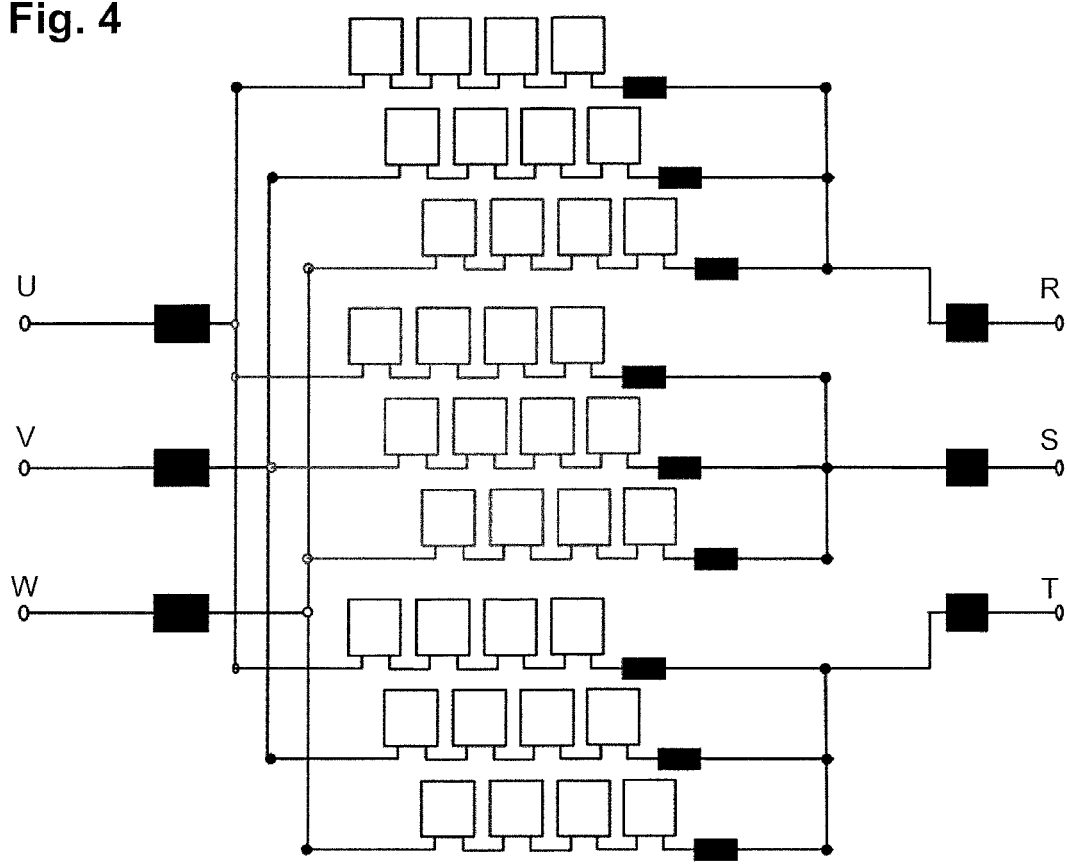
FIG. 4 depicts a 3-phase to 3-phase direct topology for hydro applications.

FIG. 3 depicts a direct topology of an exemplary rail intertie, for converting power grid line frequency current at 50 Hz to traction supply current of 16⅔ Hz to be injected in the catenary of a railway line. FIG. 4 depicts a direct topology of an exemplary variable speed three-phase to three-phase frequency converter for hydro power or bidirectional pumped-hydro power applications, where a variable frequency AC current in phases R, S, T is converted to a line frequency AC current in phases U, V, W, or vice-versa.

Figure 5:
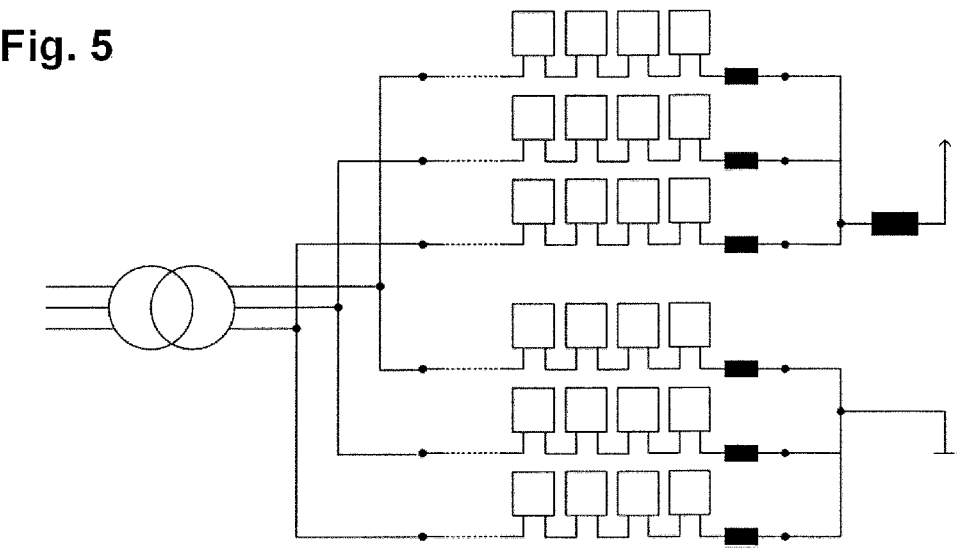
FIG. 5 depicts an indirect topology of an exemplary MMC drive application.

FIG. 5 depicts an indirect topology of an exemplary MMC drive application. The indirect AC-AC converter has top and bottom branches forming two parallel wye circuits, with a neutral point of each wye circuit being connected to a respective DC terminal.

Figure 6:
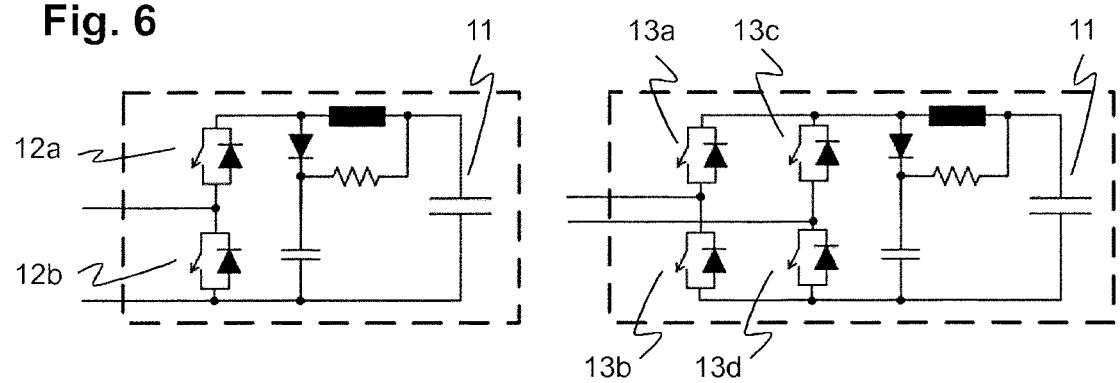
FIG. 6 shows a bipolar and a unipolar converter cell.

FIG. 6 depicts two exemplary converter cells each with power semiconductor switches and accompanying freewheeling diodes, a cell capacitance 11, and additional circuitry. In particular, a unipolar converter cell (left) with two semiconductor switches 12a, 12b, and a bipolar cell (right) with four semiconductor switches 13a to 13d are shown. In the block pulse mode, all semiconductor switches are open. In the bypass mode, switch 12b of the half bridge circuit of the unipolar cell is closed, while for the full bridge circuit of the bipolar cell two possibilities are available, either switches 13a and 13c being closed, or switches 13b and 13d being closed.

Figure 7:
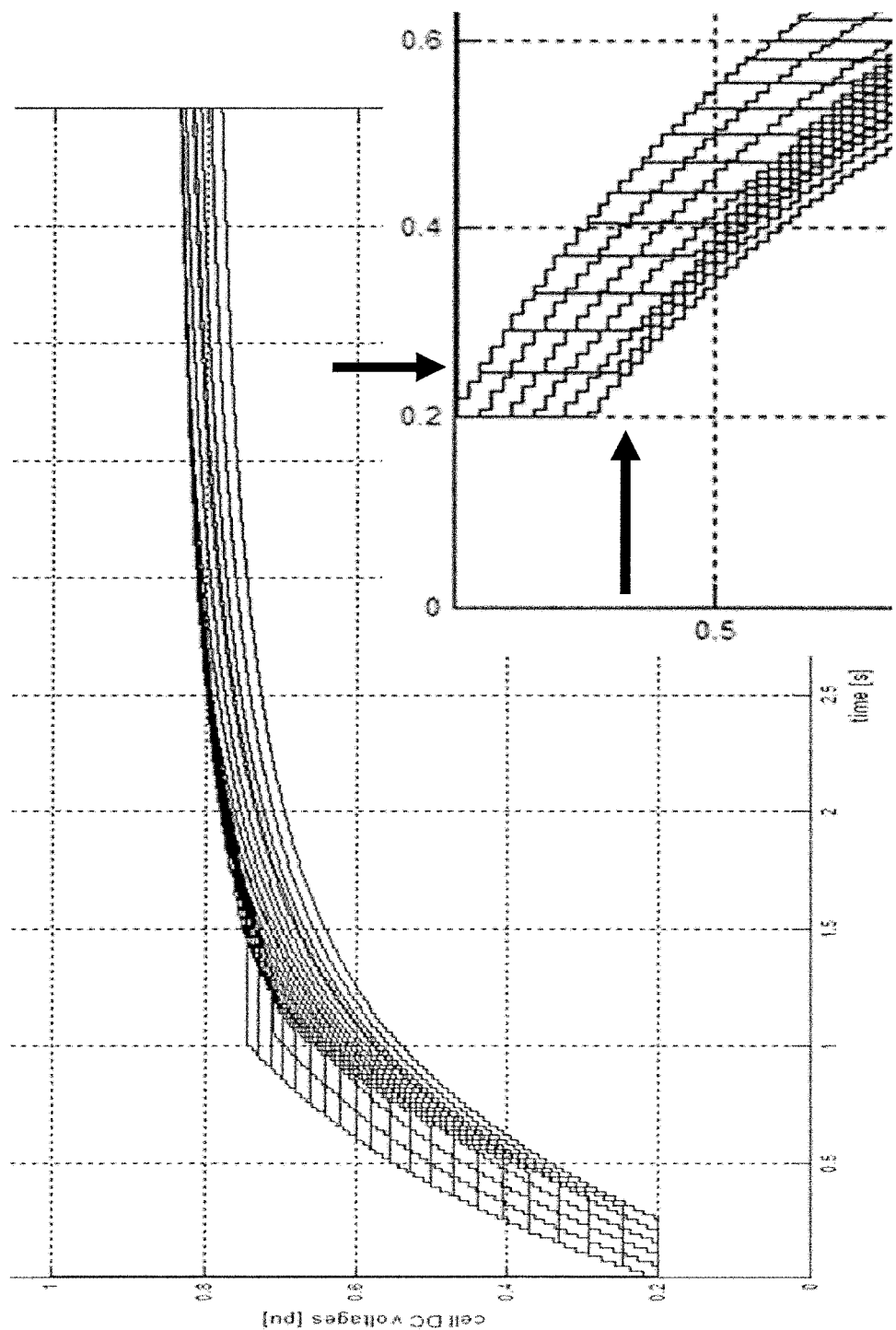
FIG. 7 is the result of a simulation of an MMC charging event.

FIG. 7 is the outcome of a computer simulation of a time evolution of cell voltages during a charging mode operation of an MMC according to the invention. The diagram depicts per-unit cell capacitor DC voltages as a function of charging time in seconds, where the lines may actually represent several cells with temporarily overlapping charging profiles. As may best be seen in the enlarged inset of the initial charging phase, a particular cell is initially operated in "pulse blocked" cell operation mode with DC cell voltage increasing from 0.2 up to 0.25 per unit (horizontal arrow), and then operated in "bypass" cell operation mode at constant, non-increasing DC cell voltage, and subsequently assigned to a "pulse blocked" converter cell subset at time t=0.35 seconds (vertical arrow) when the cell voltage increases again.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of operating a Modular Multilevel Converter MMC having a converter branch with a plurality of converter cells with a nominal cell voltage, comprising applying a branch voltage to the converter branch, the branch voltage being inferior to a nominal branch voltage cumulative of the nominal cell voltages of the cells of the branch;

selecting a first subset of the plurality of converter cells of the branch, and selecting a second subset of the plurality of converter cells which is distinct from the first subset; and operating successively the first and second subset in a pulse blocked cell operation mode with cell voltage increase, and operating a respective complementary subset of the plurality of converter cells of the branch in a bypass cell operation mode without cell voltage increase;

wherein firing pulses or gate pulses to the plurality of converter cells being blocked or suppressed in the pulse blocked cell operation mode.

2. The method of claim 1, wherein at subset selection a highest cell voltage of the first and second subset does not exceed a lowest cell voltage of the respective complementary subset.

3. The method of claim 1, wherein the MMC is operated in standby mode without nominal power exchange, including connecting the converter branch to an electric power.

4. The method of claim 1, wherein the MMC is operated in charging mode, including connecting the converter branch to an auxiliary power supply.

5. The method of claim 3, wherein the MMC is a Statcom for producing and/or absorbing reactive power.

6. The method of claim 3, wherein the MMC is a frequency converter for converting power grid line frequency current to single phase traction supply current in railway applications.

7. An MMC controller for operating a Modular Multilevel Converter MMC having a converter branch with a plurality of converter cells with a nominal cell voltage, the MMC controller being adapted to, following application to the converter branch of a branch voltage inferior to a nominal branch voltage that is cumulative of the nominal cell voltages of the cells of the branch;

select a first subset of the plurality of converter cells of the branch, and select a second subset of the plurality of converter cells which is distinct from the first subset;

operate successively the first and second subset in pulse blocked cell operation mode with cell voltage increase, and operate a respective complementary subset of the plurality of converter cells of the branch in bypass cell operation mode without cell voltage increase;

wherein firing pulses or gate pulses to the plurality of converter cells being blocked or suppressed in the pulse blocked cell operation mode.

8. The MMC controller of claim 7, which is further adapted to select the first and second subset such that a highest cell voltage of the first and second subset does not exceed a lowest cell voltage of the respective complementary subset.

9. The method of claim 2, wherein the MMC is operated in standby mode without nominal power exchange, including connecting the converter branch to an electric power grid.

10. The method of claim 2, wherein the MMC is operated in charging mode, including connecting the converter branch to an auxiliary power supply.

11. The method of claim 4, wherein the MMC is a Statcom for producing and/or absorbing reactive power.

12. The method of claim 4, wherein the MMC is a frequency converter for converting power grid line frequency current to single phase traction supply current in railway applications.

13. The method of claim 3, wherein the MMC is a frequency converter for converting variable frequency current to power grid line frequency in hydro power applications.

14. The method of claim 4, wherein the MMC is a frequency converter for converting variable frequency current to power grid line frequency in hydro power applications.

* * * * *